United States Patent [19]

Lee

[11] Patent Number: 6,067,378
[45] Date of Patent: May 23, 2000

[54] LIP CONTOUR SIGNAL RECONSTRUCTION METHOD

[75] Inventor: Chang-Buhm Lee, Seoul, Rep. of Korea

[73] Assignee: Daewoo Electronics Co., Ltd., Rep. of Korea

[21] Appl. No.: 09/108,550

[22] Filed: Jul. 1, 1998

[30] Foreign Application Priority Data

Nov. 13, 1997 [KR] Rep. of Korea ...................... 97-59817

[51] Int. Cl.⁷ ...................................... G06K 9/00
[52] U.S. Cl. .......................................... 382/203; 382/118
[58] Field of Search .................................... 382/203, 118, 382/206, 209, 219, 285, 283, 154; 704/270, 201, 235; 348/256, 14, 118, 156, 152, 135

[56] References Cited

U.S. PATENT DOCUMENTS

| | | | |
|---|---|---|---|
| 4,260,229 | 4/1981 | Bloomstein | 352/50 |
| 5,313,522 | 5/1994 | Slager | 381/48 |
| 5,500,673 | 3/1996 | Zhou | 348/156 |
| 5,960,099 | 9/1999 | Hayes, Jr. et al. | 382/118 |
| 6,014,625 | 1/2000 | Lee | 704/270 |

*Primary Examiner*—B. Tadayon
*Assistant Examiner*—Seyed Azarian

*Attorney, Agent, or Firm*—Anderson Kill & Olick

[57] ABSTRACT

In a method for reconstructing a lip contour signal (LCS) having edge points (EP's) representing the position and shape of a lip image being symmetrical, a reconstructed LCS is obtained based on the LCS by using a standard lip contour signal (SLCS) having predetermined standard edge points (SEP's), the SLCS representing the position and shape of a standard lip image being symmetrical. In detail, the center point of the LCS is first matched as an origin of a two dimensional xy-plane with the center point of the SLCS. And then the coordinates of the N number of EP's of the LCS are corrected to generate a corrected LCS having N number of corrected EP's by stretching the x-coordinates of the N number of EP's in accordance with a predetermined stretching rule under the condition that a horizontal left end EP (HLEP) and a horizontal right end EP (HREP) of the corrected LCS coincide with a horizontal left end SEP (HLSEP) and a horizontal right end SEP (HRSEP) of the SLCS, respectively, wherein the x-coordinate of the HRSEP is greater than that, of the HREP on the xy-plane. Thereafter, N number of reconstructed edge points (REP's) are obtained based on the N number of corrected EP's of the corrected LCS and the N number of SEP's of the SLCS, thereby generating a reconstructed LCS having the N number of REP's.

14 Claims, 6 Drawing Sheets

LIP CONTOUR SIGNAL RECONSTRUCTION METHOD

FIELD OF THE INVENTION

The present invention relates to a face image signal coding system; and, more particularly, to a lip contour signal reconstruction method and apparatus for use in a face image signal coding system.

DESCRIPTION OF THE PRIOR ART

In recent years, the so-called "model based coding technique" is gaining wide acceptance in various fields such as video phone, video conference, virtual reality and computer graphics industry and the like.

Generally, the physical image of a speaker shown in the video phone or the video conference screen is the upper body of the speaker. Especially, in the video phone or the video conference system, the majority of video data therefor pertains to the face of the speaker. For this reason, therefore, other data than the face of the speaker, e.g., background image data, can be ignored and only image data for the face is transmitted, thereby greatly reducing the amount of transmission data thereof.

Namely, in the video phone or the video conference system, the main part of the information transmitted and processed is that for the face image of the speaker, especially for the lip image of the speaker since the picture of lip movement during the speech is crucial to recognizing the characteristics of speech and emotional expressions of the speaker.

Therefore, in a video phone system, a lip image signal (LIS) included in a face image signal and a corresponding voice signal are simultaneously coded and transmitted. Further, in the conventional lip image signal coding process, normally a composed or reconstructed lip image signal in lieu of a corresponding lip image signal is coded and then transmitted to further reduce the amount of transmission data thereof.

A lip image signal includes a lip contour signal and a texture signal. And the lip contour signal (LCS) has N number of inter-connected edge points, wherein N is a predetermined positive integer. The lip contour signal represents the position and shape of a lip image within a face image. The texture signal has luminance data with or without chrominance data for the lip image.

Further, a LCS may be divided into an upper LCS and a lower LCS, wherein each of the upper LCS and the lower LCS has an inner LCS and an outer LCS, respectively. It is well known in the art that a LCS reconstruction process is most important in a LIS reconstruction or composition process.

Referring to FIG. 1, there is shown a block diagram of a conventional LCS reconstruction apparatus, 100 for use in a face image signal coding system. The apparatus 100 comprises a LCS extraction circuit 30, a standard lip contour signal (SLCS) providing circuit 20 and an edge point motion detection circuit 40. The apparatus 100 reconstructs a LCS by employing a conventional LCS reconstruction method described below.

First, a face image signal including a LIS having a LCS is fed to the LCS extraction circuit 30 from a face image signal supplying circuit in the face image signal coding system. The LCS extraction circuit 30, by employing a predetermined known LCS extraction method, extracts the LCS from the LIS in the face image signal to thereby provide the LCS to the edge point motion detection circuit 40 via a line L11.

Meanwhile, the SLCS providing circuit 20 provides a predetermined SLCS of a standard lip image signal to the edge point motion detection circuit 40 through a line L13. The SLCS has N number of inter-connected standard edge points corresponding to the edge points of the LCS, respectively. The SLCS represents the position and shape of a standard lip image.

The SLCS is usually stored in a memory within the SLCS providing circuit 20 and the SLCS includes an upper SLCS and a lower SLCS, wherein each of the upper SLCS and the lower SLCS has an inner SLCS and an outer SLCS, respectively.

Referring to FIG. 2, there is represented a schematic diagram depicting an outer SLCS 250 within an upper SLCS of a SLCS and an outer LCS 270 within an upper LCS of a LCS for use in explaining the LCS reconstruction process performed by the conventional lip contour signal reconstruction apparatus 100 shown in FIG. 1.

In FIG. 2, the outer SLCS 250 is expressed in a solid line having standard edge points P1 to P11 represented by small black circles thereon and the outer LCS 270 is represented in a dotted line having edge points Q1 to Q11 represented by small black circles thereon.

The edge point motion detection circuit 40 first matches the center point of the LCS as an origin of a two dimensional xy-plane with the center point of the SLCS.

And then, the edge point motion detection circuit 40 detects N number of corresponding motion vectors (MV's) for the N number of edge points of the LCS by using the N number of edge points of the LCS inputted thereto via the line L11 and the N number of standard edge points of the SLCS inputted thereto via the line L13. Each of the MV's represents a displacement between an edge point and a corresponding standard edge point.

For example, referring back to FIG. 2, Coordinates of a standard edge point P7 and an edge point Q7 are (p,p') and (q,q'), respectively. Hence, a motion vector MV7 for the edge point P7 is represented as (q-p,q'-p').

And then, the edge point motion detection circuit 40 provides a reconstructed LCS for the LCS to a transmitter for the transmission thereof, the reconstructed LCS including N number of reconstructed edge points, wherein each of the reconstructed edge points is obtained by moving a corresponding edge point by a corresponding MV.

The conventional LCS reconstruction or composition apparatus employing the conventional LCS reconstruction method described above, however, as N increases, needs a considerable amount of memory capacity, and substantial amounts of transmission data and calculation time to detect corresponding MV's for all of the edge points of a LCS, thereby rendering difficult the real time processing of a LIS, together with a corresponding audio signal, e.g., a voice signal.

SUMMARY OF THE INVENTION

It is, therefore, a primary object of the present invention to provide a lip contour signal reconstruction method for use in a face image signal coding system to enhance the lip contour signal reconstruction efficiency.

In accordance with the present invention, there is provided a method for reconstructing a lip contour signal (LCS) having N number of inter-connected edge points (EP's) representing the position and shape of a lip image in a face image, wherein the lip image and the LCS are symmetrical, respectively, and N is a predetermined positive integer, the method comprising the steps of: (a) providing a standard lip contour signal (SLCS) having N number of inter-connected standard edge points (SEP's) corresponding to the N number of edge points (EP's) of the LCS, respectively, the SLCS representing the position and shape of a predetermined standard lip image, wherein the standard lip image and SLCS are symmetrical, respectively; (b) matching the center point of the LCS as an origin of a two dimensional xy-plane with the center point of the SLCS; (c) correcting the coordinates of the N number of EP's of the LCS to generate a corrected LCS having N number of corrected EP's by stretching the x-coordinates of the N number of EP's in accordance with a predetermined stretching rule under the condition that a horizontal left end EP (HLEP) and a horizontal right end EP (HREP) of the corrected LCS coincide with a horizontal left end SEP (HLSEP) and a horizontal right end SEP (HRSEP) of the SLCS, respectively, wherein the x-coordinate of the HRSEP is greater than that of the HREP on the xy-plane; and (d) obtaining N number of reconstructed edge points (REP's) based on the N number of corrected EP's of the corrected LCS and the N number of SEP's of the SLCS to thereby generate a reconstructed LCS having the N number of REP's.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
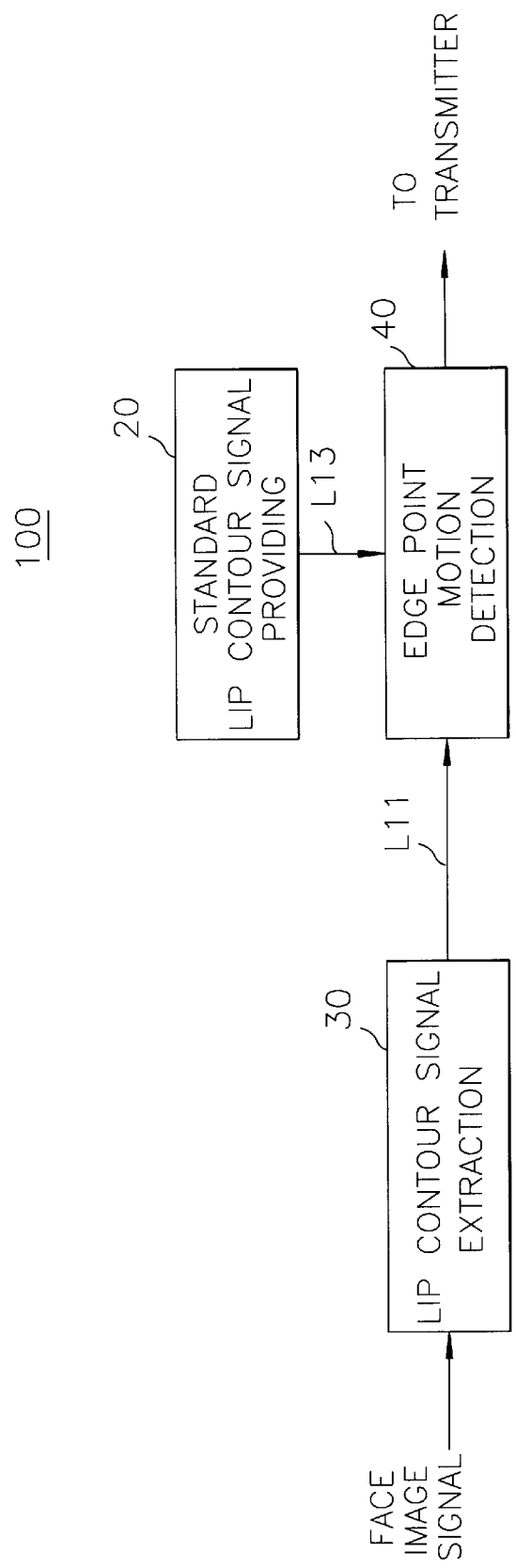
FIG. 1 shows a block diagram of a conventional lip contour signal (LCS) reconstruction apparatus for use in a face image signal coding system.
Figure 2:
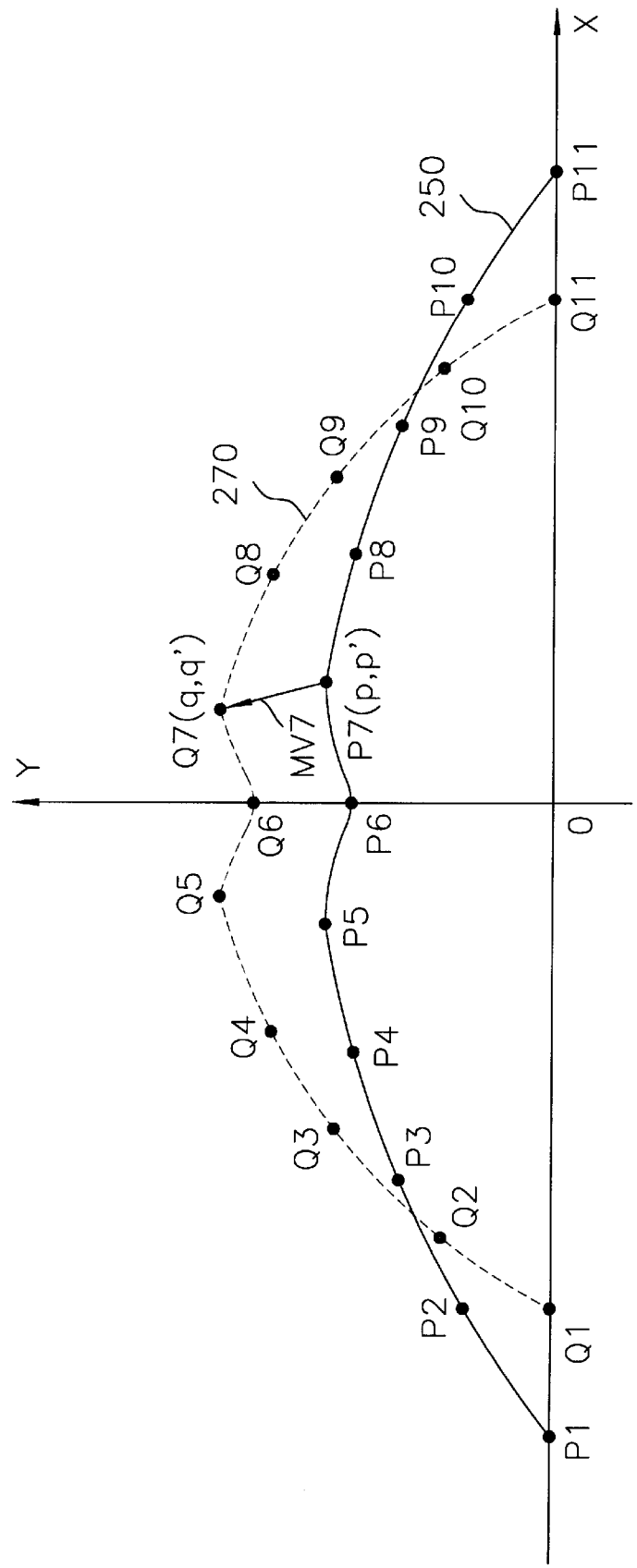
FIG. 2 represents a schematic diagram depicting an outer standard lip contour signal (SLCS) within an upper SLCS of a SLCS and an outer LCS within an upper LCS of a LCS for use in explaining a LCS reconstruction process performed by the conventional LCS reconstruction apparatus shown in FIG. 1.
Figure 3A:
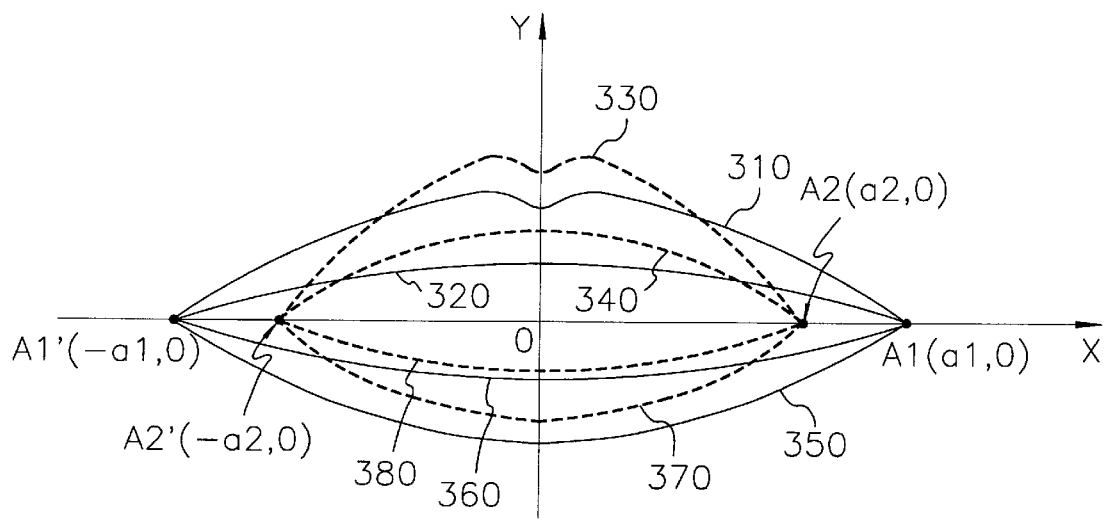
FIGS. 3A to 3F illustrate schematic graphs representing lip contour signals (LCS's) and/or standard lip contour signals (SLCS's) for use in describing a lip contour signal reconstruction method in accordance with a preferred embodiment of the present invention.
Figure 3B:
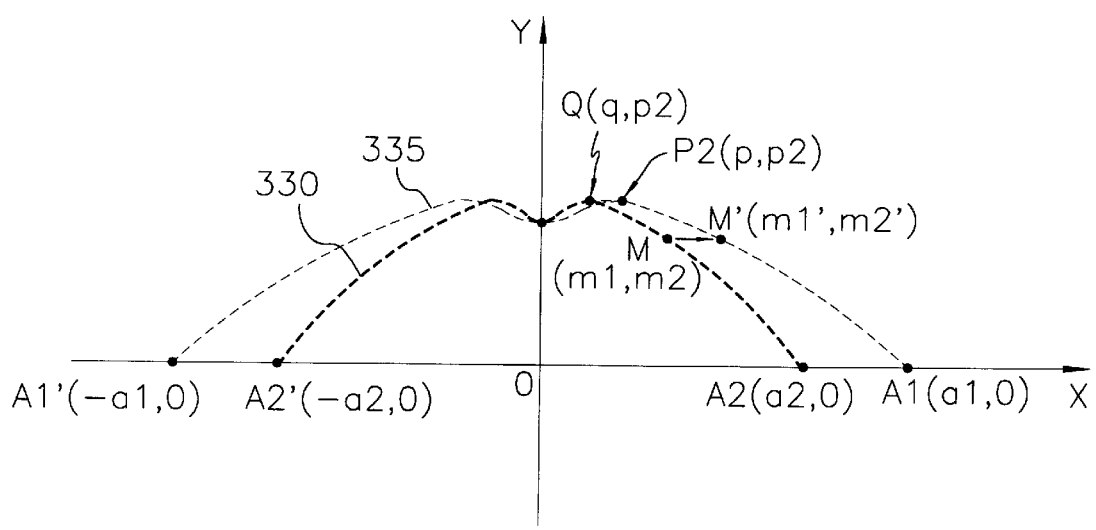
Figure 3C:
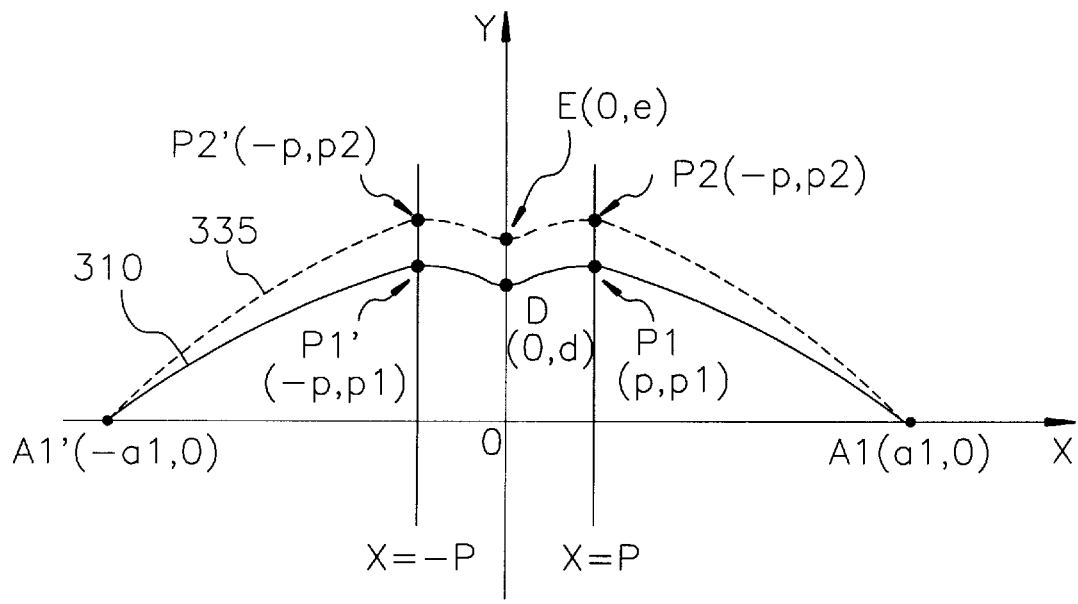

Referring to FIGS. 3A to 3B, there are illustrated schematic graphs representing lip contour signals (LCS's) and/or standard lip contour signals (SLCS's) for use in describing a lip contour signal reconstruction method in accordance with a preferred embodiment of the present invention.

Figure 4:
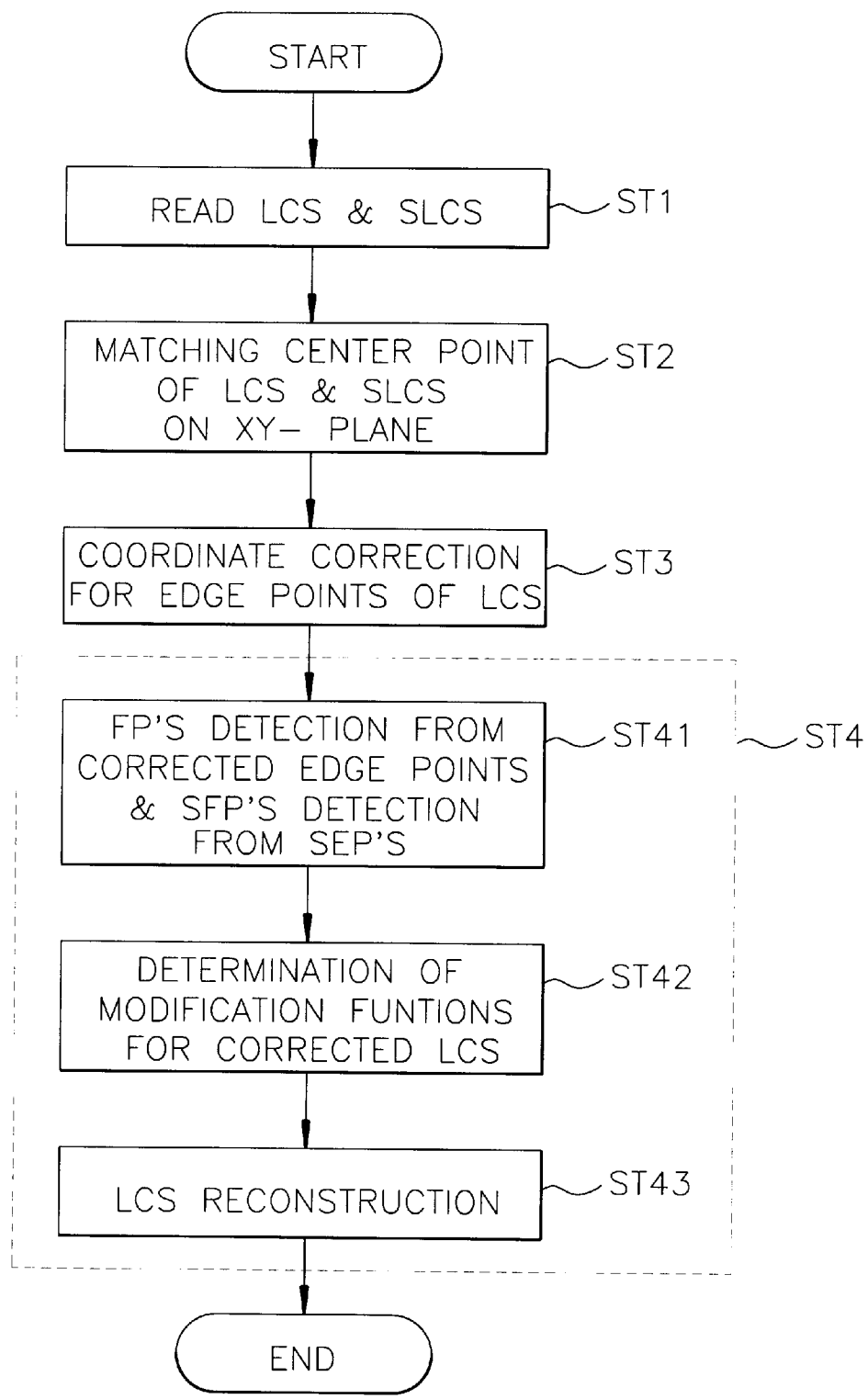
FIG. 4 depicts a flow chart for use in explaining a lip contour signal reconstruction method in accordance with a preferred embodiment of the present invention.

And referring to FIG. 4, there is depicted a flow chart for use in explaining a lip contour signal reconstruction method in accordance with a preferred embodiment of the present invention. Referring to FIG. 4, in a method or a process for reconstructing a LCS in accordance with the present invention, first at step ST1, a LCS and a predetermined SLCS are read. And then the process proceeds to step ST2.

It should be noted that the LCS has N number of inter-connected edge points (EP's) representing the position and shape of a lip image in a face image, wherein the lip image and the LCS are symmetrical, respectively and N is a predetermined positive integer.

And the SLCS has N number of inter-connected standard edge points (SEP's) corresponding to the N number of edge points (EP's) of the LCS, respectively, the SLCS representing the position and shape of a predetermined standard lip image, wherein the predetermined standard lip image and the SLCS are symmetrical, respectively.

It should be noted that in the above description, the term "symmetrical" represents that a signal, e.g., the LCS or an image, e.g., the lip image, is a mirror image with respect to the y-axis (i.e., the vertical center line) thereof.

At step ST2, the center point of the LCS is matched as an origin of a two dimensional xy-plane with the center point of the SLCS. Thereafter, the process goes to step ST3.

At step ST3, coordinates of the N number of EP's of the LCS are corrected to generate a corrected LCE having N number of corrected EP's by stretching the x-coordinates of the N number of EP's in accordance with a predetermined stretching rule under the condition that a horizontal left end EP (HLEP) and a horizontal right end EP (HREP) of the corrected LCS coincide with a horizontal left end SEP (HLSEP) and a horizontal right end SEP (HRSEP) of the SLCS, respectively. It should be noted that the x-coordinate of the HRSEP is greater than that of the HREP on the xy-plane. Then, the process flows to step ST4.

At step ST4, N number of reconstructed edge points (REP's) are obtained based on the N number of corrected EP's of the corrected LCS and the N number of SEP's of the SLCS. As a result, at step ST4, a reconstructed LCS having the N number of REP's is generated. And then, the process is ended.

In detail, in accordance with a preferred embodiment of the present invention, the step ST4 includes steps ST41, ST42 and ST43. At step ST41, K number of feature points (FP's) are detected from the N number of corrected EP's and at the same time, K number of corresponding standard feature points (SFP's) are detected from the N number of SEP's with K being a predetermined positive integer less than N. It should be noted that each of the FP's and each of the SFP's are a corrected EP and a SEP essential to defining the LCS and the SLCS, respectively. Thereafter, the process goes to step ST42.

At step ST42, first to 4th modification functions MF1 to MF4 are determined based on the K number of FP's, the K number of SFP's and first to 4th predetermined standard modification functions SMF1 to SMF4. And then, the process flows to step ST43.

In this case, the MF1 and SMF1 are functions used to obtain corrected EP's on an outer contour of a corrected upper LCS of the corrected LCS and SEP's on an outer standard contour of an upper SLCS of the SLCS, respectively.

And the MF2, MF3 and MF4 are functions used to obtain corrected EP's on an inner contour of the corrected upper LCS, corrected EP's on an inner contour of the corrected lower LCS of the corrected LCS and corrected EP's on an outer contour of a corrected lower LCS, respectively. And the SMF2, SMF3 and SMF4 are functions used to obtain SEP's on an inner standard contour of the upper SLCS, SEP's on an inner standard contour of a lower SLCS of the SLCS and SEP's on an outer standard contour of the lower SLCS, respectively.

Finally, at the ST43, the N number of reconstructed edge points (REP's) are obtained by using the MF1 to MF4 based on the N number of SEP's to thereby generate the reconstructed LCS having the N number of REP's. And then, the process is ended.

From now on, referring to FIGS. 3A to 3F, a method for reconstructing a LCS in accordance with preferred embodiments of the present invention will be described in more details. It should be noted that like points and like curves appearing in FIGS. 3A to 3F are represented by like reference numerals.

FIG. 3A illustrates a LCS having an upper LCS and a lower LCS and a SLCS having an upper SLCS and a lower SLCS. Referring to FIG. 3A, the upper LCS contains an outer contour 330 and an inner contour 340 thereof; the lower LCS contains an outer contour 370 and an inner contour 380 thereof; the upper SLCS contains an outer standard contour 310 and an inner standard contour 320 thereof; and the lower SLCS contains an outer standard contour 350 and an inner standard contour 360 thereof.

Referring to FIG. 3A, the center point of the LCS as an origin of a two dimensional xy-plane is matched with that of the SLCS. And in FIG. 3A, the HRSEP of the ALCS and the HREP of the LCS are represented as A1 and A2, respectively; the HLSEP of the SLCS and the HLEP of the LCS are represented as A1' and A2', respectively and coordinates of A1, A2, A1' and A2' are expressed as (a1,o), (a2, 0), (−a1, 0) and (−a2, 0), respectively, wherein a1 is a predetermined positive integer and a2 is a positive integer less than a1.

In FIG. 3A, a1 and a2 are x-intercepts of the graphs of the SLCS and the LCS on the xy-plane, respectively. Referring to FIG. 3B, there is shown a schematic diagram for use in describing a predetermined stretching rule in accordance with a preferred embodiment of the present invention. It should be noted that in FIGS. 3A to 3B, bold dot lines, dotted lines and solid lines represent the graphs of a LCS, a corrected LCS and a SLCS, respectively.

In accordance with the present invention, the graph of the outer contour of the upper LCS has relative maximum edge points MEP-I and MEP-II in the quadrant I and the quadrant II on the xy-plane, respectively and the graph of the outer standard contour of the upper SLCS has relative maximum standard edge points MSEP-I and MSEP-II in the quadrant I and the quadrant II on the xy-plane, respectively. For example, referring to FIG. 3B, in the quadrant I of the xy-plane, the graph of the outer contour 330 of the upper LCS has a MEP-I represented by Q. In FIG. 3B, the coordinate of Q is expressed as (q,p2).

In accordance with the predetermined stretching rule, coordinates of the EP's of the LCS are corrected to render the relative maximum corrected edge point (MCEP-I) in the quadrant I of the graph of the corrected upper LCS and the relative maximum corrected edge point (MCEP-II) in the quadrant II of the graph of the corrected upper LCS on the xy-plane being coincided with the MSEP-I and MSEP-II on the xy-plane, respectively.

In detail, the coordinate of each of the corrected EP's on the graph of the outer contour of the corrected upper LCS is obtained by the following equations:

$$(m1', m2') = \left(m1 + \left(\frac{m1}{q}\right) \times (p-q), m2\right) \ldots (-q \leq m1 \leq q),$$

$$(m1', m2') = \left(m1 + (p-q) + \frac{(m1-(p-q)) \times \alpha}{(a1-(p-q))}, m2\right) \ldots (q \leq m1 \leq a1),$$

$$(m1', m2') =$$

-continued
$$\left(m1 - (p-q) - \frac{(-m1-(p-q)) \times \alpha}{(a1-(p-q))}, m2\right) \ldots (-a1 \leq m1 \leq -q),$$

wherein α=((a1−a2)−(p−q)); p and q are x-coordinates of the MCEP-I and MEP-I, respectively; m1' and m1 are x-coordinates of a corrected EP and a corresponding SEP, respectively on the xy-plane; m2' and m2 are y-coordinates of the corrected EP and the corresponding EP, respectively; a1 and a2 are x-intercepts of the graphs of the SLCS and the LCS, respectively on the xy-plane, a1 being a predetermined positive integer and a2 being a positive integer less than a1.

For example, in FIG. 3B, P2 as a MCEP-I is obtained based on the Q in accordance with the above mentioned equation. In FIG. 3B, the coordinate of P2 is expressed as (p,p2). And the coordinate of each of the corrected EP's on the graphs of the inner contour of the corrected upper LCS, the inner contour of the corrected lower LCS and the outer contour of the corrected lower LCS is obtained by the following equation:

$$(m1', m2') = \left(m1 + \left(\frac{m1}{a2}\right) \times (a1 - a2), m2\right).$$

Meanwhile, in accordance with the present invention, the K number of FP's include the MCEP-I, MCEP-II and respective y-intercept points of the outer contour of the corrected upper LCS, the inner contour of the corrected upper LCS, the outer contour of the corrected lower LCS and the inner contour of the corrected lower LCS. And the K number of SFP's include the HLSEP, HRSEP, MSEP-I, MSEP-II and respective y-intercept points of the outer standard contour of the upper SLCS, the inner standard contour of the upper SLCS, the outer standard contour of the lower SLCS and the inner standard contour of the lower SLCS, respectively.

In accordance with a preferred embodiment of the present invention, the SMF1 and MF1 are biquadratic functions satisfying the following boundary conditions:

SMF1(a1)=SMF1(−a1)=0, $[SMF1(x)]_{x=p}$=$[SMF1(x)]_{x=-p}$=0,

MF1(a1)=MF1(−a1)=0, $[MF1(x)]_{x=p}$=$[MF1(x)]_{x=-p}$=0, wherein a1 and p are a positive x-intercept and an x-coordinate of the MSEP-I of the outer standard contour of the upper SLCS, respectively; the $[SMF1(x)]_{x=p}$ and $[SMF1(x)]_{x=-p}$ are differential coefficients at the MSEP-I and the MSEP-II, respectively; and the $[MF1(x)]_{x=p}$ and $[MF1(x)]_{x=-p}$ are differential coefficients at the MCEP-I and the MCEP-II, respectively.

In accordance with a preferred embodiment of the present invention, the MF2, SMF2, MF3, SMF3, MF4 and SMF4 are quadratic functions satisfying the following boundary conditions:

MF2(a1)=MF2(−a1)=0, MF2(0)=f',

SMF2(a1)=SMF2(−a1)=0, SMF2(0)=f,

MF3(a1)=MF3(−a1)=0, MF3(0)=b',

SMF3(a1)=SMF3(−a1)=0, SMF3(0)=b,

MF4(a1)=MF4(−a1)=0, MF4(0)=c',

SMF4(a1)=SMF4(−a1)=0, SMF4('0)=c, wherein f is a positive y-intercept of the inner standard contour of the upper SLCS on the xy-plane; b and c are negative y-intercepts of the inner standard contour and the outer standard contour of the lower SLCS on the xy-plane, respectively; f' is a positive y-intercept of the inner contour of the corrected upper LCS on the xy-plane; b' and c' are negative y-intercepts of the inner contour and the outer contour of the corrected lower LCS on the xy-plane, respectively.

Referring to FIGS. 3C to 3F, there are illustrated the outer standard contour 310 and the inner standard contour 320 of the upper SLCS; the outer standard contour 350 and the inner standard contour 360 of the lower SLCS; an outer corrected contour 335 and an inner corrected contour 345 of the corrected upper LCS; and an outer corrected contour 375 and an inner corrected contour 385 of the corrected lower LCS.

Figure 3D:
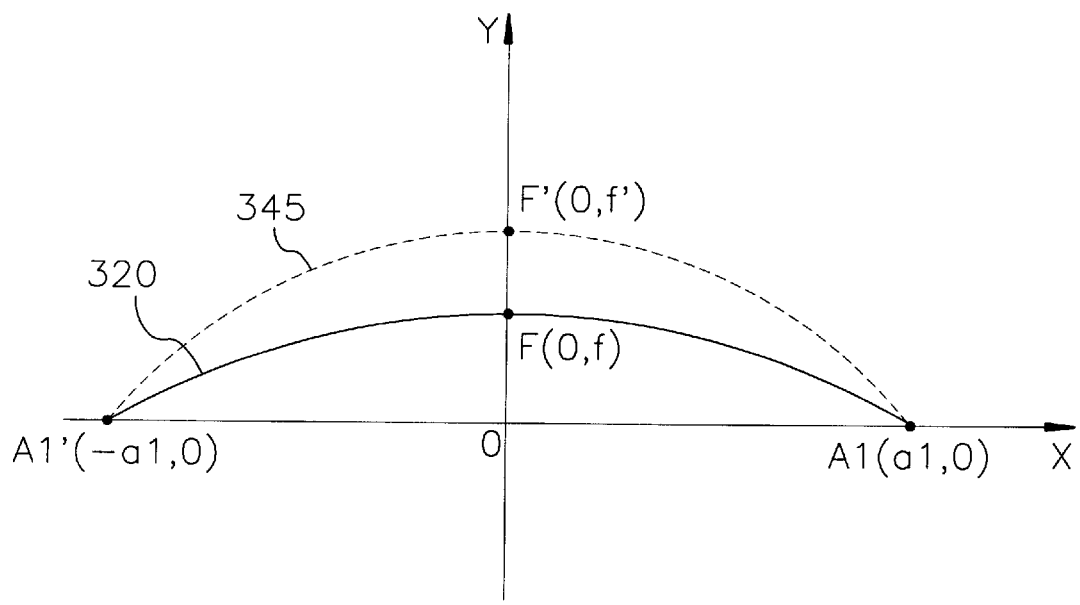
Figure 3E:
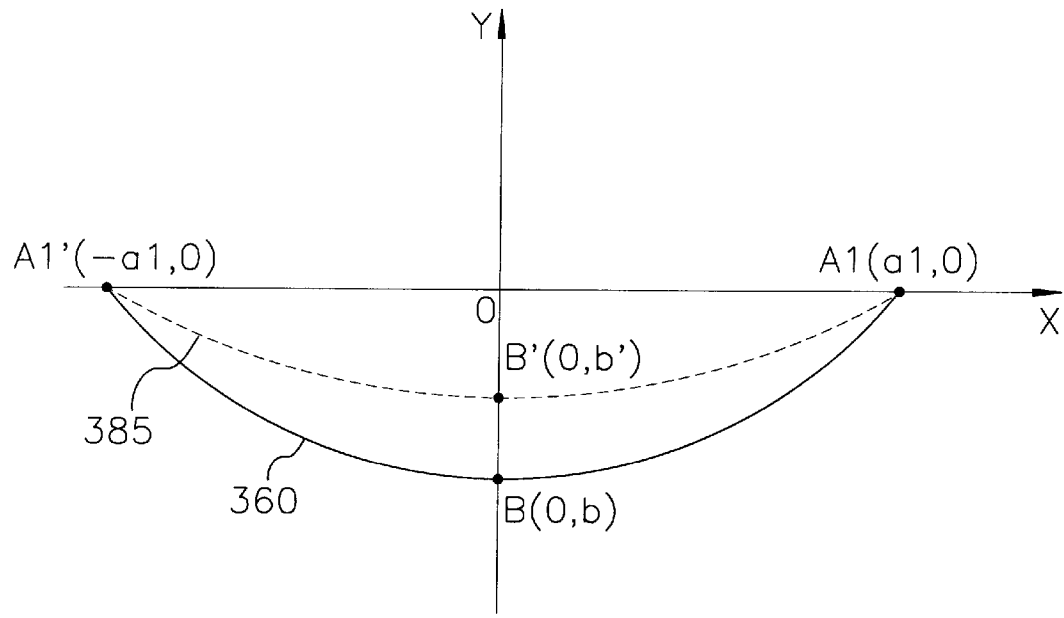

In FIG. 3D, F and F' represent y-intercepts of the graphs of the inner standard contour 320 and the inner corrected contour 345, respectively; and the coordinates of F and F' are (0,f) and (0,f'), respectively. In FIG. 3E, B and B' represent y-intercepts of the graphs of the inner standard contour 360 and the inner corrected contour 385, respectively; and the coordinates of B and B' are (0,b) and (0,b'), respectively.

Figure 3F:
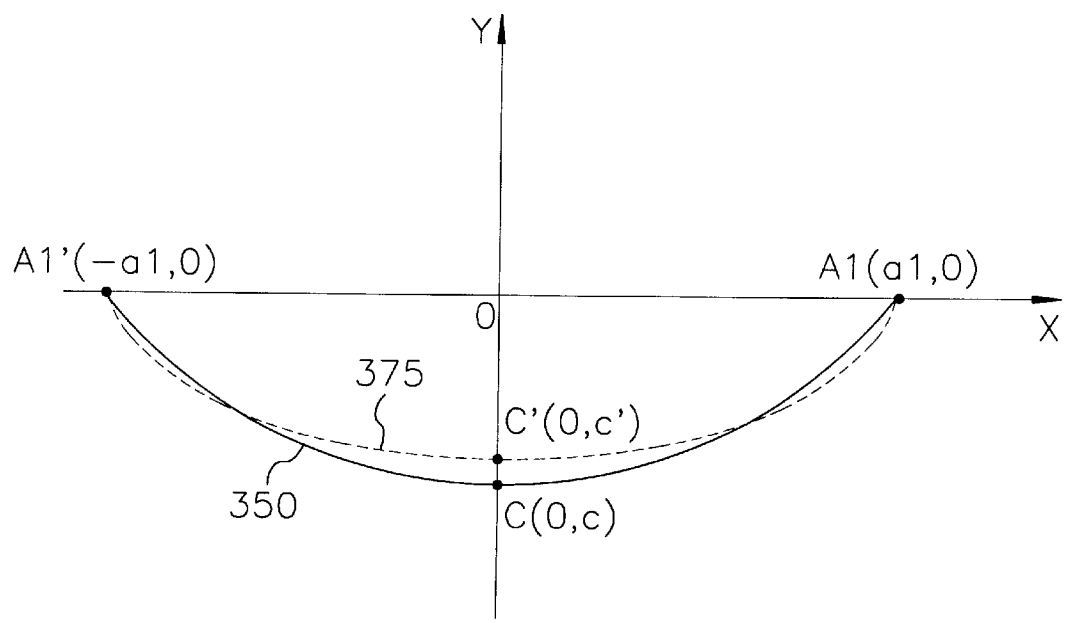

In FIG. 3F, C and C' represent y-intercepts of the graphs of the outer standard contour 350 and the outer corrected contour 375, respectively; and the coordinates of C and C' are (0,c) and (0,c'), respectively. It should be noted that in FIGS. 3C to 3F, dotted lines and solid lines represent the graphs of corrected LCS's and SLCS's, respectively.

In accordance with another preferred embodiment of the present invention, the MF2, MF3, MF4, SMF2, SMF3 and SMF4 are either hyperbolic functions or ellipsoidal functions satisfying the above mentioned boundary conditions therefor.

In accordance with a preferred embodiment of the present invention, the SMF1 is represented as the following equation:

$$SMF1(x) = k1(x^4 - 2p^2x^2) + d,$$

wherein d is a positive y-intercept of the outer standard contour of the upper SLCS on the xy-plane; and k1 is a constant obtained by the following equation:

$$k1 = -\frac{d}{al^4 - 2p^2al^2}.$$

And the MF1 is represented as the following equation:

$$MF1(x) = k2(x^4 - 2p^2x^2) + e = (k2/K1)\,SMF1(x) + e - (k2/K1)d = e/d\,ESMF1(x),$$

wherein e is a positive y-intercept of the outer contour of the corrected upper LCS on the xy-plane; k2 is a constant obtained by the following equation:

$$k2 = -\frac{e}{al^4 - 2p^2al^2}.$$

The SMF2, SMF3 and SMF4 are represented by the following equations:

$$SMF2(x) = -\frac{f}{al^2}(x + al)(x - al),$$

$$SMF3(x) = -\frac{b}{al^2}(x + al)(x - al),$$

$$SMF4(x) = -\frac{c}{al^2}(x + al)(x - al).$$

Further, the MF2, MF3 and MF4 are represented as the following equations:

$$MF2(x) = -\frac{f'}{al^2}(x + al)(x - al) = \frac{f'}{f}SMF2(x),$$

$$MF3(x) = -\frac{b'}{al^2}(x + al)(x - al) = \frac{b'}{b}SMF3(x),$$

$$MF4(x) = -\frac{c'}{al^2}(x + al)(x - al) = \frac{c'}{c}SMF4(x).$$

As a result, as can be easily understood in the above description, the MF1(x) to MF4(x) can be obtained by using SMF1(x) to SMF4(x), respectively, based on the y-intercepts (b', c', e and f') among the K number of FP's detected from the N number of corrected EP's of the corrected LCS and the y-intercepts (b, c, d and f) among the K number of SFP's detected from the N number of SEP's of the SLCS.

And then, the N number of reconstructed edge points (REP's) are obtained by using the MF1 to MF4 based on the N number of SEP's to thereby generate the reconstructed LCS having the N number of REP's.

In detail, in this case, an x-coordinate (r1) and a y-coordinate (r2) of each of the REP's of the reconstructed LCS are by setting the x-coordinate of a corresponding SEP as the r1 and setting a corresponding one of values MF1 (r1), MF2 (r2), MF3(r1) and MF4(r1) as the r2, respectively.

Consequently, the lip contour signal reconstruction method in accordance with the present invention, a lip contour signal is effectively reconstructed by using predetermined modification functions, thereby decreasing the reconstruction time for the lip contour signal, the amount of transmission data thereof and enhancing the reconstruction efficiency thereof.

While the present invention has been shown and described with respect to the particular embodiments, it will be apparent to those skilled in the art that many changes and modifications may be made without departing from the spirit and scope of the invention as defined in the following claims.

What is claimed is:

1. A method for reconstructing a lip contour signal (LCS) having N number of inter-connected edge points (EP's) representing the position and shape of a lip image in a face image, wherein the lip image and LCS are symmetrical, respectively and N is a predetermined positive integer, the method comprising the steps of:

(a) providing a standard lip contour signal (SLCS) having N number of inter-connected standard edge points (SEP's) corresponding to the N number of edge points (EP's) of the LCS, respectively, the SLCS representing the position and shape of a predetermined standard lip image, wherein the standard lip image and SLCS are symmetrical, respectively;

(b) matching the center point of the LCS as an origin of a two dimensional xy-plane with the center point of the SLCS;

(c) correcting the coordinates of the N number of EP's of the LCS to generate a corrected LCS having N number of corrected EP's by stretching the x-coordinates of the N number of EP's in accordance with a predetermined stretching rule under the condition that a horizontal left end EP (HLEP) and a horizontal right end EP (HREP) of the corrected LCS coincide with a horizontal left end SEP (HLSEP) and a horizontal right end SEP (HRSEP) of the SLCS, respectively, wherein an x-coordinate of the HRSEP is greater than that of the HREP on the xy-plane; and (d) obtaining N number of reconstructed edge points (REP's) based on the N number of corrected EP's of the corrected LCS and the N number of SEP's of the SLCS to thereby generate a reconstructed LCS having the N number of REP's.

2. The method according to claim 1, wherein said step (d) includes the steps of:

(d1) detecting K number of feature points (FP's) from the N number of corrected EP's generated at the step (c) and K number of corresponding standard feature points (SFP's) from the N number of SEP's, K being a predetermined positive integer less than N, wherein each of the K number of FP's and each of the K number of SFP's are a corrected EP and a SEP essential to defining the LCS and the SLCS, respectively;

(d2) determining first to 4th modification functions MF1 to MF4 based on the K number of FP's, the K number of SFP's and predetermined first to 4th standard modification functions SMF1 to SMF4, wherein said MF1 and SMF1 are functions used to obtain corrected EP's on an outer contour of a corrected upper LCS of the corrected LCS and SEP's on an outer standard contour of an upper SLCS of the SLCS, respectively; said MF2, MF3 and MF4 are functions used to obtain corrected EP's on an inner contour of the corrected upper LCS, corrected EP's on an inner contour of the corrected lower LCS of the corrected LCS and corrected EP's on an outer contour of a corrected lower LCS, respectively; and said SMF2, SMF3 and SMF4 are functions used to obtain SEP's on an inner standard contour of the upper SLCS, SEP's on an inner standard contour of a lower SLCS of the SLCS and SEP's on an outer standard contour of the lower SLCS, respectively; and (d3) obtaining the N number of reconstructed edge points (REP's) by using the MF1 to MF4 based on the N number of SEP's to thereby generate the reconstructed LCS having the N number of REP's.

3. The method according to claim 2, where(in the graph of the outer contour of the upper LCS has relative maximum edge points MEP-I and MEP-II in the quadrant I and the quadrant II on the xy-plane, respectively and the graph of the outer standard contour of the upper SLCS has relative maximum standard edge points MSEP-I and MSEP-II in the quadrant I and the quadrant II on the xy-plane, respectively.

4. The method according to claim 3, wherein, in accordance with the predetermined stretching rule, the coordinates of the EP's of the LCS are corrected to render the relative maximum corrected edge point (MCEP-I) in the quadrant I of the graph of the corrected upper LCS and the relative maximum corrected edge point (MCEP-II) in the quadrant II of the graph of the corrected upper LCS being coincided with the MSEP-I and MSEP-II on the xy-plane, respectively.

5. The method according to claim 4, wherein, in accordance with the predetermined stretching rule, the coordinate of each of the corrected EP's on the graph of the outer contour of the corrected upper LCS is obtained by the following equations:

$$(m1', m2') = \left(m1 + \left(\frac{m1}{q}\right) \times (p-q), m2\right) \ldots (-q \le m1 \le q),$$

$$(m1', m2') = \left(m1 + (p-q) + \frac{(m1-(p-q)) \times \alpha}{(a1-(p-q))}, m2\right) \ldots (q \le m1 \le a1),$$

$$(m1', m2') = \left(m1 - (p-q) - \frac{(-m1-(p-q)) \times \alpha}{(a1-(p-q))}, m2\right) \ldots (-a1 \le m1 \le -q),$$

wherein $\alpha = ((a1-a2)-(p-q))$; p and q are x-coordinates of the MCEP-I and MEP-I, respectively; m1' and m1 are x-coordinates of a corrected EP and a corresponding SEP, respectively on the xy-plane; m2' and m2 are y-coordinates of the corrected EP and the corresponding EP, respectively; a1 and a2 are x-intercepts of the graphs of the SLCS and the LCS, respectively on the xy-plane, wherein a1 being a predetermined positive integer and a2 being a positive integer less than a1.

6. The method according to claim 5, wherein, in accordance with the predetermined stretching rule, the coordinate of each of the corrected EP's on the graphs of the inner contour of the corrected upper LCS, the inner contour of the corrected lower LCS and the outer contour of the corrected lower LCS is obtained by the following equation:

$$(m1', m2') = \left(m1 + \left(\frac{m1}{a2}\right) \times (a1-a2), m2\right).$$

7. The method according to claim 6, wherein, the K number of FP's include the MCEP-I, MCEP-II and respective y-intercept points of the outer contour of the corrected upper LCS, the inner contour of the corrected upper LCS, the outer contour of the corrected lower LCS and the inner contour of the corrected lower LCS; and the K number of SFP's include the HLSEP, HRSEP, MSEP-I, MSEP-II and respective y-intercept points of the outer standard contour of the upper SLCS, the inner standard contour of the upper SLCS, the outer standard contour of the lower SLCS and the inner standard contour of the lower SLCS, respectively.

8. The method according to claim 7, wherein, said SMF1 and MF1 are biquadratic functions satisfying the following boundary conditions:

SMF1(a1)=SMF1(−a1)=0, [SMF1(x)]$_{x=p}$=[SMF1(x)]$_{x=-p}$=0,

MF1(a1)=MF1(−a1)=0, [MF1(x)]$_{x=p}$=[MF1(x)]$_{x=-p}$=0, wherein a1 and p are a positive x-intercept and an x-coordinate of the MSEP-I of the outer standard contour of the upper SLCS, respectively; the [SMF1(x)]$_{x=p}$ and [SMF1(x)]$_{x=-p}$ are differential coefficients at the MSEP-I and the MSEP-II, respectively; and the [MF1(x)]$_{x=p}$ and [MF1(x)]$_{x=-p}$ are differential coefficients at the MCEP-I and the MCEP-II, respectively.

9. The method according to claim 8, wherein, said MF2, SMF2, MF3, SMF3, MF4 and SMF4 are quadratic functions satisfying the following boundary conditions:

MF2(a1)=MF2(−a1)=0, MF2(0)=f',

SMF2(a1)=SMF2(−a1)=0, SMF2(0)=f,

MF3(a1)=MF3(−a1)=0, MF3(0)=b',

SMF3(a1)=SMF3(−a1)=0, SMF3(0)=b,

MF4(a1)=MF4(−a1)=0, MF4(0)=c',

SMF4(a1)=SMF4(−a1)=0, SMF4(0)=c, wherein f is a positive y-intercept of the inner standard contour of the upper SLCS on the xy-plane; b and c are negative y-intercepts of the inner standard contour and the outer standard contour of the lower SLCS on the xy-plane, respectively; f' is a positive y-intercept of the inner contour of the corrected upper LCS on the xy-plane; b' and c' are negative y-intercepts of the inner contour and the outer contour of the corrected lower LCS on the xy-plane, respectively.

10. The method according to claim 9, wherein, said SMF1 is represented by the following equation:

$$SMF1(x) = k1(x^4 - 2p^2x^2) + d,$$

wherein d is a positive y-intercept of the outer standard contour of the upper SLCS on the xy-plane; and k1 is a constant obtained by the following equation:

$$k1 = -\frac{d}{a1^4 - 2p^2 a1^2}.$$

11. The method according to claim 10, wherein, said MF1 is represented by the following equation:

$$MF1(x) = k2(x^4 - 2p^2x^2) + e = \left(\frac{k2}{k1}\right)SMF1(x) + e - \left(\frac{k2}{k1}\right)d = \frac{e}{d}SMF1(x),$$

wherein e is a positive y-intercept of the outer contour of the corrected upper LCS on the xy-plane; k2 is a constant obtained by the following equation:

$$k2 = -\frac{e}{a1^4 - 2p^2 a1^2}.$$

12. The method according to claim 11, wherein, said SMF2, SMF3 and SMF4 are represented by the following equations:

$$SMF2(x) = -\frac{f}{a1^2}(x + a1)(x - a1),$$

$$SMF3(x) = -\frac{b}{a1^2}(x + a1)(x - a1),$$

$$SMF4(x) = -\frac{c}{a1^2}(x + a1)(x - a1).$$

13. The method according to claim 12, wherein, said MF2, MF3 and MF4 are represented as the following equations:

$$MF2(x) = -\frac{f'}{a1^2}(x + a1)(x - a1) = \frac{f'}{f}SMF2(x),$$

$$MF3(x) = -\frac{b'}{a1^2}(x + a1)(x - a1) = \frac{b'}{b}SMF3(x),$$

$$MF4(x) = -\frac{c'}{a1^2}(x + a1)(x - a1) = \frac{c'}{c}SMF4(x).$$

14. The method according to claim 13, wherein, an x-coordinate (r1) and a y-coordinate (r2) of each of the REP's of the reconstructed LCS are obtained by setting the x-coordinate of a corresponding SEP as the r1 and setting a corresponding one of values MF1(r1), MF2(r2), MF3(r1) and MF4(r1) as the r2, respectively.

* * * * *